March 27, 1928.   1,663,628
E. T. FERNGREN
FLOWING AND DRAWING CONTINUOUS SHEET GLASS
Filed Oct. 20, 1922   2 Sheets-Sheet 1

INVENTOR
Enoch T. Ferngren
BY C. A. Rowley
ATTORNEY

March 27, 1928.  
E. T. FERNGREN  
1,663,628  
FLOWING AND DRAWING CONTINUOUS SHEET GLASS  
Filed Oct. 20, 1922  
2 Sheets-Sheet 2

INVENTOR  
Enoch T. Ferngren  
By C. A. Rowley  
ATTORNEY

Patented Mar. 27, 1928.

1,663,628

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

FLOWING AND DRAWING CONTINUOUS SHEET GLASS.

Application filed October 20, 1922. Serial No. 595,741.

This invention relates to the art of drawing sheet glass and more particularly to an improved method and apparatus for flowing molten glass from a receptacle over an overflow lip, and then drawing this glass into sheet form.

In previous attempts to flow a sheet of glass from a receptacle, the difficult problems encountered have included securing a uniform and constant flow of glass across the entire width of the sheet, and also maintaining the glass in a sufficiently fluid condition to flow from the receptacle without adhering to the overflow lip, and at the same time providing sufficient plasticity or resistance in the glass to serve as an anchor for the sheet source from which the sheet is drawn. The present invention aims to disclose certain forms of apparatus by means of which the above problems may be satisfactorily solved and a continuous and uniform sheet of high quality obtained. The invention also includes an improved edge forming device whereby sufficient edge tension and stiffness is obtained without undue attenuation of the sheet edges.

In the accompanying drawings, which show by way of example two forms of apparatus embodying the principles of this invention:

Figure 1:
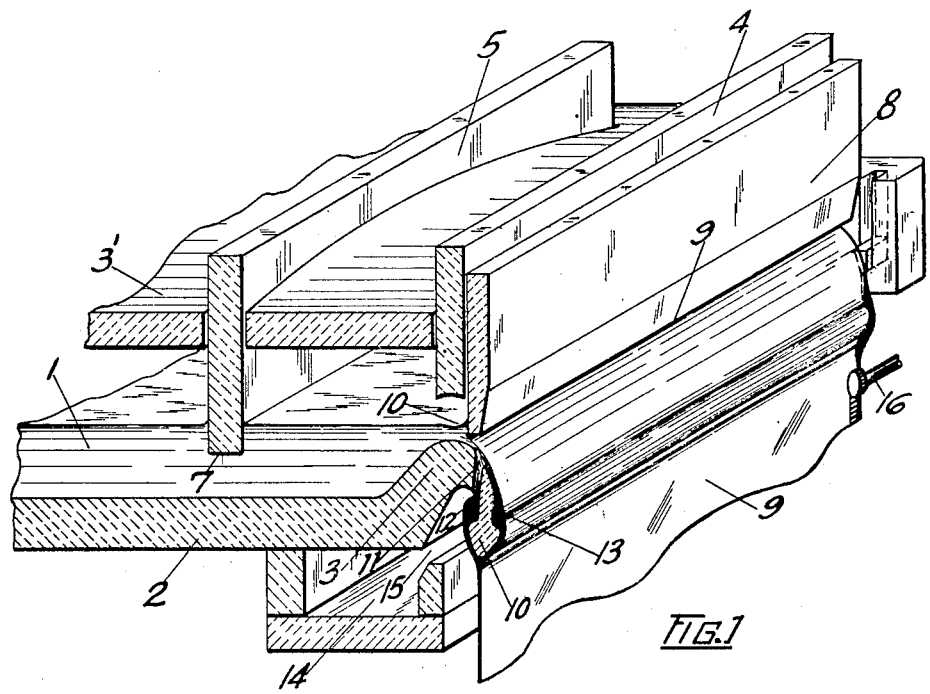
Fig. 1 is a perspective of one form of the apparatus, the front portion of this view being shown in longitudinal vertical section.
Figure 2:
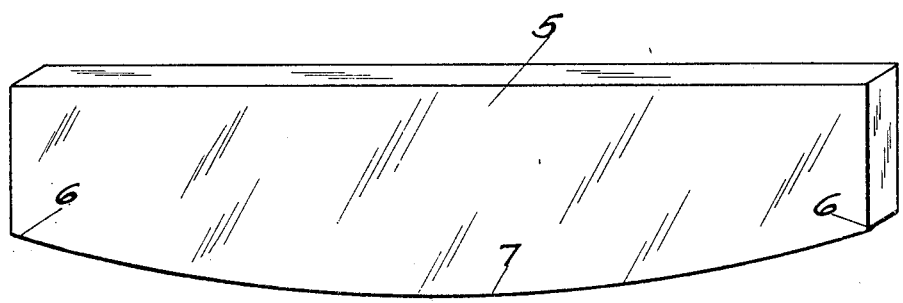
Fig. 2 is a perspective of the form of flow regulating member used in the apparatus shown in Fig. 1.
Figure 3:
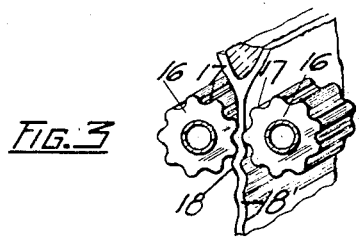
Fig. 3 is a perspective, partly in vertical section of a pair of sheet edge cooling and crimping rollers.

Referring first to the form of the apparatus shown in Figs. 1 to 3, inclusive, a receptacle or container for the molten glass 1 is shown at 2, this container being in open communication with a continuous tank furnace or some other suitable source of supply for the molten glass. It will be understood that this container 2 is closed at the sides and is covered at the top by a suitable roof or arch 3'. The forward end of the container 2 slopes upwardly and outwardly as shown at 3, the rounded upper edge of this wall 3 stopping somewhat short of the level of the pool of molten glass 1, whereby the glass will flow in a thin stream over this wall. In order to cut off this flow of glass when desired, a gate 4 is provided which may be lowered by any suitable means into the molten glass and into contact with the top of wall 3.

In order to secure a satisfactory sheet of glass, it is essential that the flow of molten glass from the receptacle be uniform in rate, volume and temperature across its entire width. It is also well known that the molten glass adjacent the sides of the receptacle will be somewhat cooled and retarded so that the glass in the central portions of the receptacle will be more fluid and flow at a more rapid rate. The flow regulating device indicated at 5 has been designed to compensate for this unequal flow and provide an even current of glass at all points across the width of the container. This member 5, as shown in Fig. 2, has its lower edge curved downwardly from the ends 6 to the central portion 7. When this member is in operative position, its lower edge will dip somewhat into the stream of molten glass, and since the central portion projects further into the molten glass than those portions adjacent the ends, a greater retarding and cooling effect will take place near the center of the receptacle. By properly proportioning the curvature of this lower edge member 5 and by projecting the same the proper distance into the pool 1 of molten glass, a uniform and even flow of glass may be obtained toward the overflow lip across the entire width of the receptacle or container.

At the outer front end of the container, beyond cut-off gate 4, and over the overflow lip 3, is positioned a second gate member 8 supported and adjustable vertically by any suitable means so that its lower edge 9 may be projected into the flowing stream of glass to any desired extent. An exit passage will be left between the lower edge 9 of this gate and the upper edge of the overflow lip, and since the molten glass will bank up somewhat behind the gate 9, as shown at 10, a greater head of glass may be obtained to insure a continuous and steady flow of glass over the lip.

The outer portion of the overflow lip from which the glass sheet is drawn downwardly, consists of a separate horizontal tongue member 10 of suitable refractory material, which is positioned parallel to and in slightly spaced relation from the outer edge 11 of the overflow wall 3. This tongue 10 is preferably provided with a suitable glass sustaining and flow impeding ledge 12 on its rear wall or face, and may also have a similar ledge 13 on its front face. The purpose of these ledges will be referred to hereinafter.

The heating chamber 14 is arranged beneath the lip 3, and heat from this chamber is directed through passage 15 against the glass flowing along the under face of tongue 10 as hereinafter described. This chamber 14 also functions to maintain the molten glass above the overflow wall 3 in a sufficiently fluid condition.

In operation, a portion of the shallow stream of molten glass flowing over wall 3 continues its flow over and down the outer side of tongue member 10, but a portion of the stream is caught in the space or passage between the tongue 10 and the front face 11 of wall 3 and flows down through this passage to the under face of tongue 10. This inner stream of glass will bank upon, and be somewhat retarded by the ledge 12, and the ledge 13 on the front face of tongue 10 will function in the same manner to retard the stream of glass flowing down the outer face of the tongue. The ledges 12 and 13 accumulate sufficient glass to permit an equalization of temperature and flow movement. The accumulation will overflow into two streams which will unite on the lower edge of tongue 10 to form the sheet source from which sheet 9 is drawn downwardly by any suitable means. The molten glass 1 which flows from the receptacle 2 in a fluid and freely flowing condition, will after leaving the receptacle become somewhat cooled or coagulated to a more plastic state by its passage around the refractory tongue member 10, to which the glass will adhere with considerable tenacity. This resistance to its downflow is increased by impeding shoulders 12 and 13, already described. The combined effect will be to so support the mass of plastic glass at the lower edge of the tongue 10 that the sheet 9 must be drawn or stretched therefrom and will not fall away under the influence of gravity alone. Since the molten glass leaves the receptacle 3 in a highly heated fluid condition, there will be no tendency for this glass to adhere to the edges of the draw-off lip or to the gate 8, and form lines or strings which would ultimately cause blemishes in sheet surfaces.

It is usually found necessary to provide an added supporting and cooling means for the sheet edges, so that there will be a greater drawing tension exerted in these edge portions. For this purpose, I have illustrated by way of example, a pair of edge forming rollers 16 engaging the edge of the sheet directly below its point of formation at the lower edge of tongue 10. It will be understood that these rollers are internally cooled by any suitable means. The rollers are preferably driven at a speed somewhat slower than the sheet is being drawn away so as to provide an added resistance in the edge portions of the sheet. By forming the peripheries of these rollers with teeth or undulations 17, the edge portions of the sheet passed therebetween will be crimped, as shown at 18, Fig. 3, which will give an added stiffness to the sheet edge. Furthermore, this crimped edge may be straightened out somewhat, as indicated at 18', under the greater tension exerted at the sheet edges, thus allowing for an increased tension and stiffness in the sheet edges without undue attenuation or thinning of these edge portions.

Figure 4:
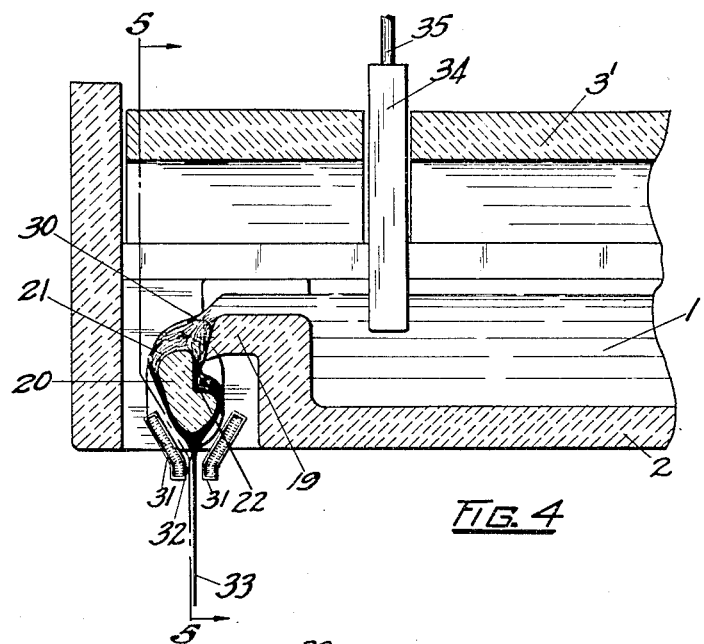
Fig. 4 is a longitudinal vertical section through another modification of the apparatus.
Figure 5:
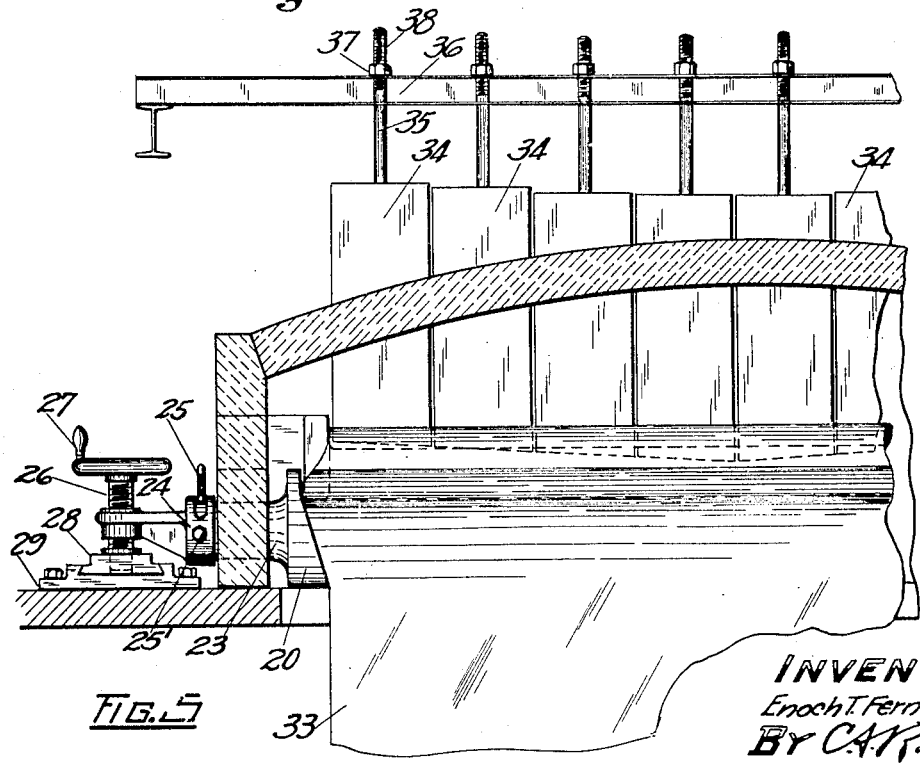
Fig. 5 is a partial transverse vertical section through this apparatus taken substantially on the line 5—5 of Fig. 4.

A somewhat different form of apparatus is disclosed in Figs. 4 and 5. The molten glass 1 in receptacle 2 flows as before over a lip 19 at the front end of the receptacle. The refractory tongue 20 used in this form of the apparatus is somewhat different in contour from the tongue 10 previously described. It is so shaped that the glass flowing over the forward side of the tongue is carried momentarily upon the upper wall 21 of the tongue, which functions somewhat the same as the ledge 13, shown in Fig. 1, to support and maintain an exposed body of plastic glass. On the rear wall of the tongue 20 is a rather wide horizontal ledge 22 which is analogous to and functions much the same as the ledge 12 in Fig. 1. The entire tongue member 21 is mounted for adjustment in several directions so that its position relative to the overflow lip 19 may be changed as found desirable. The reduced end portions 23 of the tongue are carried by and rotatably adjustable in supporting collars 24. The tongue may be swung back or forth by handles 25 and is held in adjusted position by any suitable securing means 25'. Each supporting collar 24 is carried on a vertical supporting screw 26 in threaded engagement with the outer end of the collar or support 24. This screw 26 may be manipulated to raise or lower the tongue by means of a handle 27, and the screw is carried at its lower end in a slide-plate 28 mounted for horizontal adjustment in supporting plate 29. By moving plate 28 back or forth in its slideways, the tongue 20 may be adjusted closer to or further from the lip 19, and by suitable manipulation of the elevating screws 26, the upper portion of tongue 20 may be raised or lowered in the stream of glass 30 flowing over lip 19. The tongue may also be rotatably adjusted in the supporting collars 24 to vary somewhat the proportions of the streams 30 which flow down the front and rear faces of the tongue. In this form of the invention, a pair of coolers 31 are positioned at the sides of the glass forming the sheet source 32 at the lower edge of the tongue member to assist in stiffening and rendering more plastic or tenacious this glass from which the sheet 33 is drawn downwardly.

A somewhat different form of flow regulator is embodied in the modification shown in Figs. 4 and 5. In this case, the regulator instead of being one continuous member such as 5 in Figs. 1 and 2, is composed of a series of separate units 34 arranged edge to edge across the width of the pot so that the assembled series has practically the same shape and contour as the member 5 already described. Each unit 34 is suspended by any suitable means such as the threaded rod 35 projecting through supporting beam 36 and hung therefrom by means of the adjusting nut 37 threaded on the upper end 38 of the rod. By adjusting nut 37 up or down on the rod 35, the respective units 34 may be raised or lowered in the stream of molten glass and thus vary the retarding effect at that point as may be found desirable. Obviously, this form of flow retarder could be used in the modification shown in Fig. 1, as well as the simpler form 5 now illustrated in said figure, and it is to be understood that these two forms of regulator are entirely interchangeable in the different modifications.

Claims:

1. The method of producing sheet glass, which consists in providing a constant flow of molten glass through a containing receptacle, retarding the central portions of the flow to compensate for the retardation caused by the sides of the receptacle, and flowing this uniform stream of glass over and under a detached overflow lip at the end of the receptacle, the glass sheet being drawn from the uniting streams at the lower edge of this lip.

2. An apparatus for continuously producing sheet glass, comprising a receptacle for the molten glass having an overflow lip at one end thereof, the overflow lip comprising a separate member mounted parallel to and slightly spaced from the overflow edge of the receptacle, the member being formed with a horizontal glass retarding ledge on its under face, the molten glass flowing down both faces of the member and forming the sheet source at the lower edge of the member.

3. An apparatus for continuously producing sheet glass, comprising a receptacle for the molten glass having an overflow lip at one end thereof, the overflow lip comprising a separate member mounted parallel to and slightly spaced from the overflow edge of the receptacle, so that the flowing glass will pass both over and under this member and unite to form the sheet source at the outer edge of the member, the member being formed with horizontal glass retarding ledges to impede the free flow of the glass.

4. An apparatus for continuously producing sheet glass, comprising a receptacle for the molten glass having an overflow lip at one end thereof, a flow regulator projecting down into the molten glass within the receptacle, the regulator extending deeper into the molten glass at the center of the receptacle than adjacent the sides thereof, and provisions whereby the molten glass may flow from the receptacle around both the upper and lower faces of the lip, the streams uniting at the edge of the lip to form the sheet source.

5. The method of drawing sheet glass, which consists in causing a flow of molten glass over an overflow wall of rigid structure, in positioning a refractory member alongside the wall in the path of the gravity descent of the glass, in providing horizontally running and laterally projecting ledges on the member, and in receiving the glass thereon in a manner to cause the same to proceed along the opposite sides thereof while in part checking its movement with the ledges, and forming accumulations of the glass along the same, in flowing the glass onward from each accumulation toward a point of confluency along the lower ridge of the member, in applying drawing stress to this glass and drawing the sheet of glass therefrom while transmitting tractive impulse to the accumulating glass to constantly supply a quantity of glass equal to that withdrawn from the ridge of the member.

6. The method of drawing sheet glass, which consists in causing a flow of molten glass from a plane adjacent the surface level of a body of glass along an overflow wall of rigid structure, in positioning a refractory member alongside the wall in the path of the gravity descent of the glass, in providing horizontally running and laterally projecting ledges on the member, and in receiving the glass thereon in a manner to cause the same to proceed along the opposite sides thereof while in part checking its movement with the ledges, and forming accumulations of the glass along the same, in flowing the glass onward from each accumulation toward a point of confluency along the lower ridge of the member, in applying drawing stress to this glass and drawing the sheet of glass therefrom while transmitting tractive impulse to the accumulating glass to constantly supply a quantity of glass equal to that withdrawn from the ridge of the member, and forming a sheet of glass of suitable thickness by increasing or decreasing the tractive stress thereon during drawing.

7. The method of drawing sheet glass, which consists in causing a movement of molten glass over a horizontally extending refractory tile, and advancing a shallow stream of glass over the front face of the tile onto a therefrom spaced flow-guiding member and downwardly on said member in a surrounding fashion to a point of united departure along the lower edge of the member, in forming accumulations of the glass with retarded flow movement along the extent of the member, progressively coagulating the exposed surfaces of the glass as it moves along the opposite sides of the lower portion of the member while maintaining body fluidity of the glass on the upper portion thereof, in transmitting drawing stress to the glass on the member and the accumulations through the coagulated surfaces, and producing a constant progress of the exterior layer on the opposite surfaces of the member, under drawing stress, toward the said point of united departure, and forming a descending sheet of glass of practically stable structure beneath the member.

8. In the drawing of sheet glass, the method which consists in dividing a flow of glass, and forming two discharging accumulations for feeding a sheet source therefrom, in uniting the discharging flow proceeding from each accumulation at a point adjacent to and between the same to form a sheet source, and in imparting tractive stress to the glass of said source, and extending a sheet of glass therefrom.

9. The method of supporting a downwardly moving sheet of glass from its edge portions, which consists in engaging each edge portion of the glass as it is being drawn from its source with a pair of gripping rollers and shaping the edge glass into a wavy border rim, in imparting semi-rigid tenacity to the glass thus shaped by abstracting heat therefrom, and during the principal sheet forming period drawing the waved glass of each rim into a supporting edge for the sheet.

10. The method of supporting a downwardly moving sheet of glass from its edge portions, which consists in engaging each edge portion of the glass as it is being drawn from its source with a pair of gripping rollers and shaping the edge glass into a wavy border rim, in imparting semi-rigid tenacity to the glass thus shaped by abstracting heat therefrom, and during the principal sheet forming period drawing the waved glass of each rim into a straight line edge for the sheet, without materially stretching the edge glass and thereby affording semi-rigid and tensioned edge support for the downwardly moving sheet area as it is formed.

11. The method of supporting a downwardly moving sheet of glass from its edge portions, which consists in engaging each edge portion of the glass as it is being drawn from its source with a pair of gripping rollers and shaping the edge glass into a wavy border rim, in imparting semi-rigid tenacity to the glass thus shaped by abstracting heat therefrom, and during the principal sheet forming period straightening the edges for the sheet without materially stretching the edge glass and thereby affording support from above for the downwardly moving sheet area as it is formed.

12. In the drawing of sheet glass, the method which consists in forming two constantly maintained surface exposed bodies in a state of constant discharge from along their surface portions, and forming a suspended sheet source from the said discharging glass, in cooling the opposite surfaces of the said source as it is formed and causing the drawn emergence therefrom of a sheet of glass while simultaneously supporting the sheet along its edges with cooling rollers adjacent the said source, and in making said edges extensible in conformity with the requirements for attenuation in the forming sheet area by crimping the glass of each edge.

13. In the drawing of sheet glass, the method which consists in forming two constantly maintained surface exposed bodies in a state of constant discharge from along their surface portions, and forming a suspended sheet source from the said discharge glass, in cooling the opposite surfaces of the said source as it is formed and causing the drawn emergence therefrom of a sheet of glass while simultaneously supporting the sheet area which is produced, by making the glass along the edges thereof more rigid, and by supporting said edge glass with sets of rollers adjacent the said source, and imparting extendibility to said edges in conformity with the variations of attenuation in the forming sheet area without impairing the rigidity of the edges and their sheet supporting quality, by first crimping and thereafter straightening said edges during the stretching period of sheet formation.

Signed at Toledo, in the county of Lucas, and State of Ohio, this 16th day of October, 1922.

ENOCH T. FERNGREN.